United States Patent
Tey et al.

(10) Patent No.: US 7,113,181 B2
(45) Date of Patent: Sep. 26, 2006

(54) DISPLAY DEVICE AND METHOD OF CHANGING THE DISPLAY SETTINGS THEREOF

(75) Inventors: Ching Hwa Tey, Singapore (SG); Ngoc Long Freddy Huynh, Singapore (SG)

(73) Assignee: Koninklijke Philips Electronics N. V., Eindhoven, IL (US)

( * ) Notice: Subject to any disclaimer, the term of this patent is extended or adjusted under 35 U.S.C. 154(b) by 346 days.

(21) Appl. No.: 10/270,980

(22) Filed: Oct. 15, 2002

(65) Prior Publication Data
US 2003/0090479 A1    May 15, 2003

(30) Foreign Application Priority Data
Oct. 18, 2001    (SG)    ................................... 01/00209

(51) Int. Cl.
G09G 5/00    (2006.01)
(52) U.S. Cl. ...................... 345/204; 345/690
(58) Field of Classification Search ................ 345/156, 345/157, 158, 169, 168, 163, 601, 597, 690, 345/204, 205; 348/734
See application file for complete search history.

(56) References Cited

U.S. PATENT DOCUMENTS

| 3,471,740 | A | | 10/1969 | Dreyfoos, Jr. et al. | ......... 315/10 |
| 4,965,557 | A | * | 10/1990 | Schepers et al. | ............ 345/169 |
| 5,237,417 | A | * | 8/1993 | Hayashi et al. | ............. 348/569 |
| 5,739,809 | A | * | 4/1998 | McLaughlin et al. | ....... 345/594 |
| 5,767,919 | A | * | 6/1998 | Lee et al. | ...................... 725/37 |
| 5,828,351 | A | | 10/1998 | Wu | .............................. 345/11 |
| 6,151,418 | A | * | 11/2000 | Bleck et al. | ................ 382/274 |
| 6,239,782 | B1 | * | 5/2001 | Siegel | ......................... 345/690 |
| 6,292,228 | B1 | * | 9/2001 | Cho | ............................ 348/603 |
| 6,558,002 | B1 | * | 5/2003 | Miyashita | .................... 353/42 |
| 6,693,629 | B1 | * | 2/2004 | Naito | ......................... 345/418 |

FOREIGN PATENT DOCUMENTS

EP    0773676 A2    5/1997

* cited by examiner

Primary Examiner—Xiao Wu

(57) ABSTRACT

A method of changing display settings of a device (5) for displaying a video signal includes generating new display settings by varying the value of a first display parameter defining the display settings, between a first limit and a second limit; displaying an image on a screen (6) according to the new display settings; and replacing the display settings by the new display settings upon a given command. The new display settings are generated by varying the value of at least one other display parameter defining the display settings simultaneously with the value of the first display parameter.

2 Claims, 2 Drawing Sheets

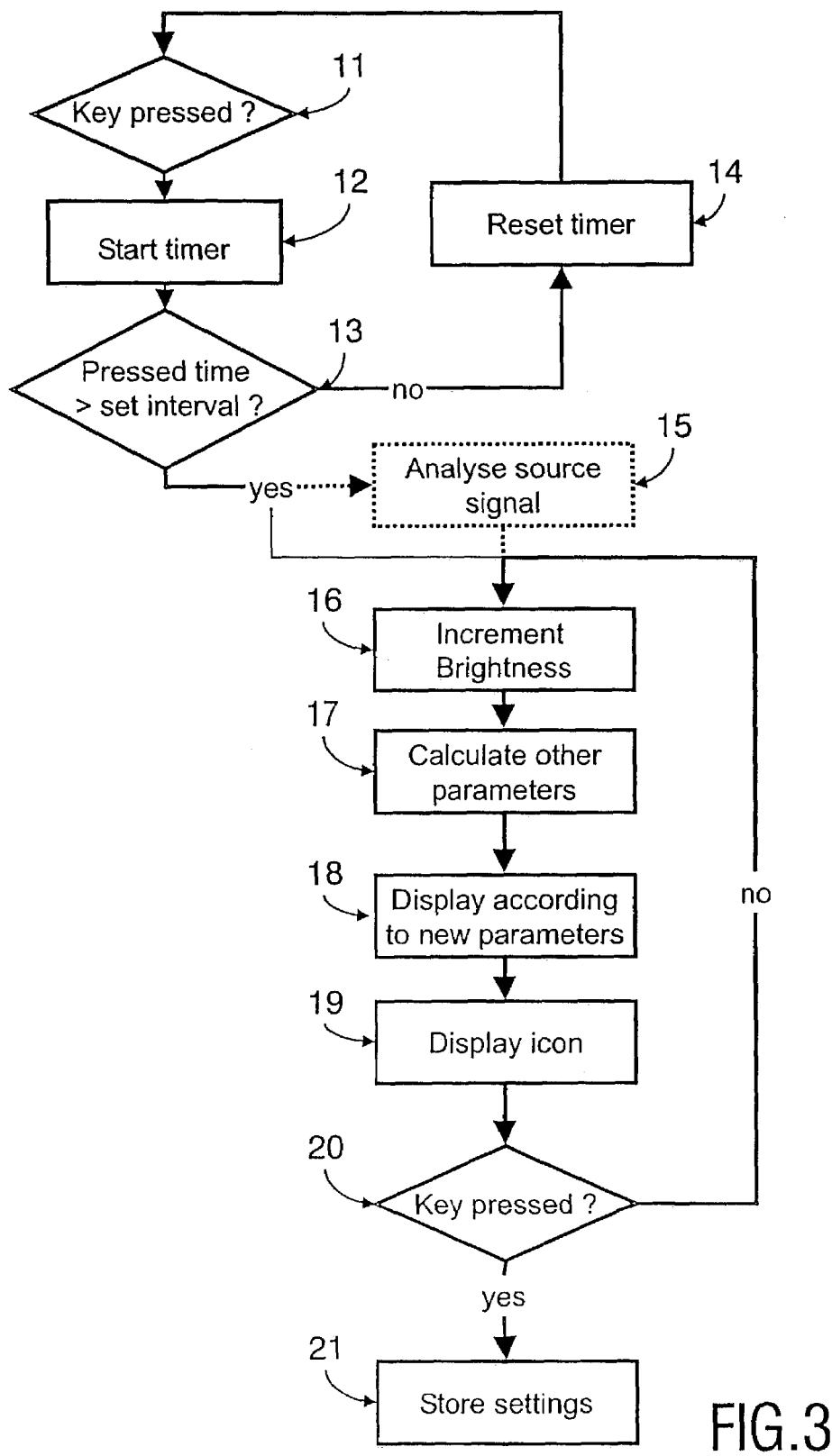

DISPLAY DEVICE AND METHOD OF CHANGING THE DISPLAY SETTINGS THEREOF

BACKGROUND OF THE INVENTION

1. Field of the Invention

The invention relates to a method of changing display settings of a device for displaying a video signal, comprising generating new display settings by varying the value of a first display parameter defining the display settings between a first limit and a second limit; displaying an image on a screen according to the new display settings; and replacing the display settings by the new display settings upon a given command.

The invention further relates to a display device comprising a video signal receiver, a display controller for processing the video signal according to certain display settings, defined by a plurality of display parameters and changeable through user-given commands, and an image projection system for converting the processed video signal to an image on a screen, wherein the display controller is capable of generating new display settings by varying the value of a first display parameter, defining the display settings, between a first limit and a second limit, processing the video signal according to the new display settings, and replacing the display settings by the new display settings upon a user-given command.

2. Description of the Related Art

U.S. Pat. No. 6,828,351 discloses a method and display device of the above-mentioned kind. By pressing a select key on a monitor, a display function is selected. A display parameter value associated with the selected display function is automatically varied to alter the display. When an adjust key is pressed, the varying of the display parameter value ceases, whereupon the parameter value is modified by pressing the adjust key.

The known method does not make clear to the user how different display parameters interact to determine the quality of the image. It is not clear to the user that, having changed one parameter value, he/she can achieve an even better image quality by also adjusting the other display parameters.

SUMMARY OF THE INVENTION

It is an object of the present invention to provide an improved method and display device of the above-mentioned kind.

Accordingly, the method according to the invention is characterized in that the new display settings are generated by varying the value of at least one other display parameter defining the display settings simultaneously with the value of the first display parameter.

Thus, a user can take the combined effect of the display parameters on the picture quality into account, when adjusting the display settings to his/her liking.

According to an aspect of the invention, the value of each of the other display parameters is simultaneously varied according to a pre-defined relation between the other display parameter and the first display parameter.

Thus, combinations of display parameter values that are far removed from an acceptable image quality can be avoided, simplifying and shortening the adjustment process.

The display device according to the invention is characterized in that the display controller is programmed to generate the new display settings by varying the value of at least one other display parameter defining the display settings simultaneously with the value of the first display parameter.

In this way, a user of the display device can adjust several display parameter values at once. Therefore, recursive selection and alteration of the values of the separate display parameters to select the combination that represents an optimum for the user, are not necessary.

According to an aspect of the invention, the display device comprises a single button for providing the user-given commands.

Thus, a user not previously acquainted with the device is provided with a straightforward way of changing the display settings. Such a user need not resort to consulting a handbook or to a process of trial and error.

BRIEF DESCRIPTION OF THE DRAWINGS

The invention will now be explained in further detail with reference to the enclosed drawings, in which:

FIG. 3 shows a flowchart detailing some important steps in an embodiment of the method according to the invention.

DESCRIPTION OF THE PREFERRED EMBODIMENTS

Figure 1:
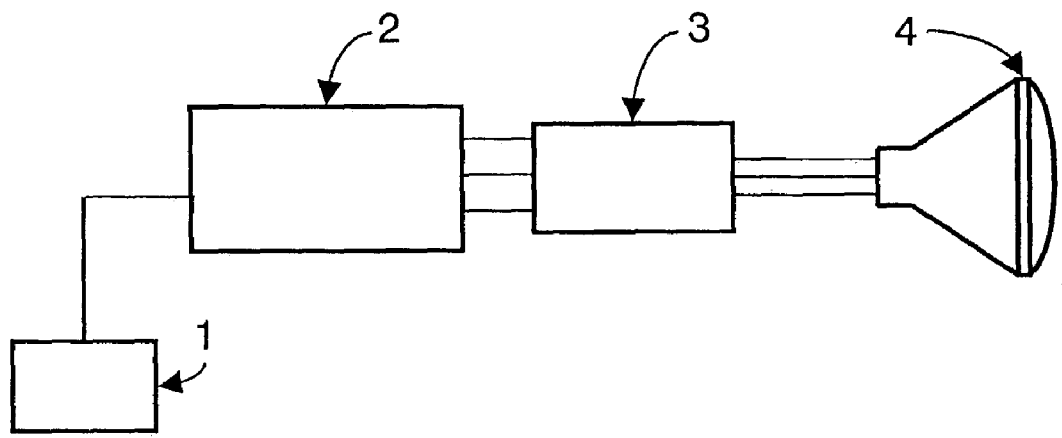
FIG. 1 shows a block diagram of a display device according to the invention.

FIG. 1 shows, in basic block diagram form, some components of a display device in which the invention is implemented. The display device includes a tuner 1 for receiving a video signal from a source. The source can be the TV aerial, a satellite dish, a cable source, a video recorder, a computer or set-top box, etc. The tuner 1 converts the signal to a video signal according to one of the standards used for TV signals, e.g., PAL/NTSC/SECAM. It is then passed to a display controller 2, either directly or, in the case of digital TV, through a demodulator, demultiplexer and/or a decompressor (not shown).

The display controller 2 can be a single chip processor, or it can be a processing circuit comprised of several distinct components, which co-operate to convert the TV signal to one or more signals to control a display system for generating an image on a screen. Identifiable sub-components of the display controller 2 include, at least, a processor and memory. The available memory consists of Random Access Memory (RAM) and Read Only Memory (ROM), wherein the latter can be of the programmable type, e.g., EEPROM. Functions, such as the processing of the video signal, are contained as a set of instructions in memory.

Several other components can be attached to the display controller 2, depending on its capabilities. Components can be present, for example, to process sound, add teletext pages or an on-screen display, etc. Components are preferably in communication with each other through a bus, for instance, an IIC bus.

The display controller 2 is capable of processing the video signal according to certain stored display settings, defined by a plurality of display parameters. The values of these parameters can be changed through commands given by the user of the TV. Examples of these parameters include the brightness, contrast, saturation, etc. The display settings determine how the video signal is converted to an image.

The display settings can be changed using the method according to the invention, as will be explained in further detail below.

To generate an image, output signals from the display controller 2 are passed to a video output amplifier 3, which controls a Cathode Ray Tube (crt) 4. In this example, there are three output signals for the colors red, green and blue. The output signals from the display controller 2 are converted to an image on the screen through known means.

Figure 2:
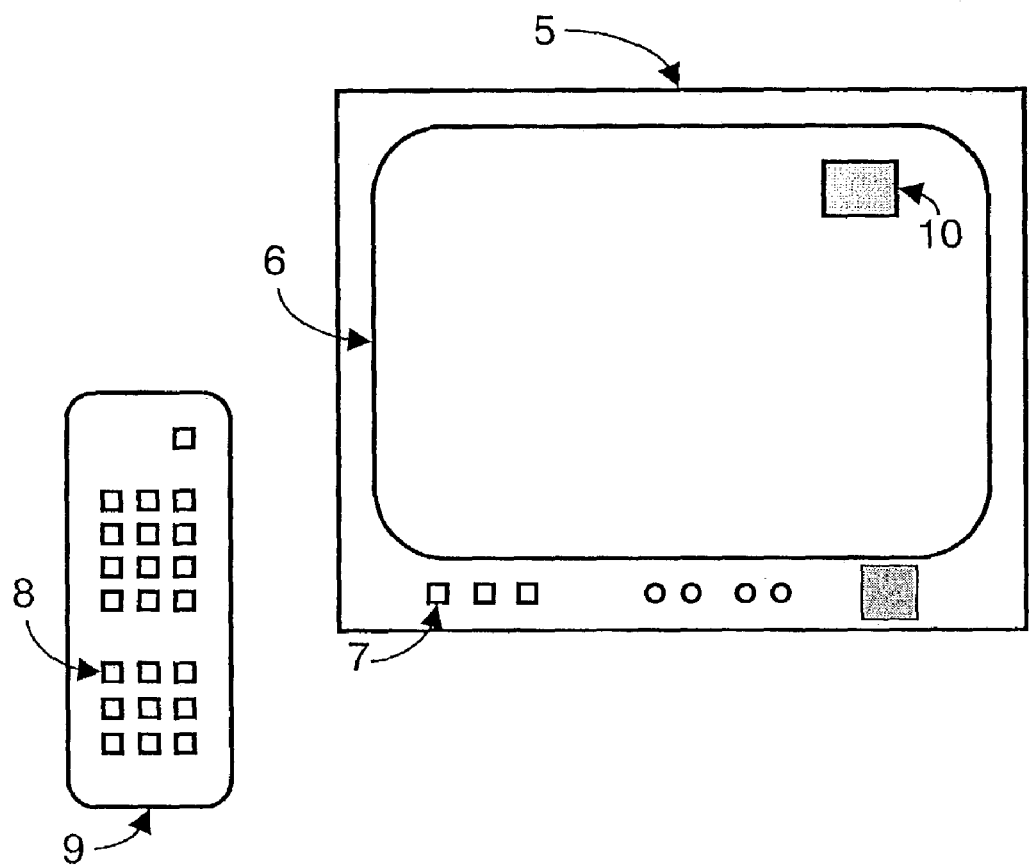
FIG. 2 shows a schematic front view of a television set according to the invention.

FIG. 2 shows a front view of a television set 5. The set comprises the components of FIG. 1. The television set 5 has a screen 6 on which images are displayed. These images have been generated by converting a video signal, after it has been processed according to certain display settings. The display settings are changeable by a user of the television set 5. By issuing commands, the user can change display parameters defining the display settings, to adjust the picture on the screen 6 according to his/her taste.

According to the invention, the user of the television set 5 can provide the commands for changing the display settings through one single button. By this, it is meant that only one button need be used throughout the whole procedure. This can be a button 7 on the television set 5 itself, or a button 8 on a remote control unit 9 provided with the television set 5. The advantage of using one button 7 or 8 is that a user doesn't have to go through a lengthy learning process before he can change the display settings. Trial and error, or the consultation of a user guide are not necessary. Known systems make use of two or more buttons with different functions in order to change the display settings. Often, one button has more than one function, depending on the stage of the adjustment procedure the user is in. This invariably leads to confusion and difficulties for the user.

The display controller 2 is capable of generating new display settings, which are temporarily held in memory. It generates the new display settings by varying a first parameter, preferably the brightness, between a first limit and a second limit.

Once a user has indicated, through pressing either one of the buttons 7, 8, that the display settings should be altered, the value of the first parameter is changed in increments. After each change, the picture on the screen 6 is displayed using the new settings.

Using the method of the invention, the display controller 2 simultaneously varies one or more other display parameters, e.g., the contrast and saturation. Thus the display controller 2 cycles through a series of display settings, i.e., combinations of display parameter values. The picture is displayed according to the new display settings after each change. When the user has decided that the new display settings currently being used are best for him/her, the user again presses the single button 7 or 8. The display parameter values used at that moment to display the image on the screen 6, are stored, replacing the initial display settings, and the process of changing the display settings ends. The user can now continue viewing, wherein the new display settings are used to process the video signal.

In a preferred embodiment of the invention, the new display settings are altered by incrementing the parameter values from the first limit to the second limit in steps, wherein an icon 10 appears on the screen 6 each time that the display settings have been adjusted. Thus, an alert is provided when alterations to the new display settings are made. Of course, other ways of making the alteration known to the user can be used within the scope of the invention. These means can consist, for example, of an audio signal, the lighting up of an LED on the television set 5, or the display of a blank image on the screen 6 during a short interval. Upon reaching the second limit, the value of the first parameter is reset to the first limit. Each of these two measures serves to provide the user with a clear indication of an adjustment to the display settings. Otherwise, it may not be immediately clear that the display parameters have taken on new values, or that the user has already seen a picture generated using the current new display settings.

The method according to the invention will now be explained in further detail with reference to FIG. 3, wherein some steps comprised in the method according to the invention are shown.

Four steps 11–14 are present in a preferred embodiment to prevent accidental initiation of the method. In this embodiment, the television set 5, in which the method is being used, comprises a timer for delaying change of the display parameter values until the single button 7 or 8 has been depressed over a certain time interval. Only if the single button 7 or 8 is held down long enough, does execution of the method move to a next step 15.

As an optional feature, a next step 15, comprising analyzing the source signal, can be part of the method according to the invention. In this embodiment of the invention, the quality of the video signal is determined in order to adjust the display parameters according to the quality of the video signal. This has the advantage that different values can be used for the display parameters for different quality signals, thus providing a more pleasing picture to the user. Inappropriate display settings can be avoided, thus shortening the time needed to arrive at the desired display settings. More suitable combinations of first and other parameters can be offered for selection by the user.

The value of the first parameter, in the example of FIG. 3 the brightness, is then increased or decreased in steps. For each new value of the first parameter, a suitable value for the other parameters is determined. In a preferred embodiment, a pre-defined relation is used to calculate the values of the other display parameters.

A preferred embodiment of the invention uses a relation based on empirical studies of the optimal combination of display parameter values. Thus, the method can be used by a large group of users, since the chances of arriving at an acceptable picture quality are highest in this way.

The pre-defined relation can be stored as a function, relating the parameter values, in the memory of the display controller 2. When different display settings are used for different video signal qualities, different functions can also be used, or the range of values for the parameters can be restricted. This embodiment saves memory, since only the function need be stored. The function(s) could, for example, be stored as a table of weights for the terms in a polynomial or exponential sum. The values of the simultaneously varied display parameters can then be calculated by entering the value of the first display parameter and evaluating the polynomial or exponential sum, using the tabulated weights.

Alternatively, the relation can be stored as a series of parameter value combinations in a look-up table in the memory of the display controller 2. This solution demands less processing capacity, since it mainly requires retrieval of values from memory. Different look-up tables can be used for different quality video signals, or different sub-ranges within one look-up table can be used for different signal qualities. It is possible to use only the points comprised in the look-up table. In this case, the value of the first parameter is increased or decreased from one value in the look-up table to a next value in the look-up table.

Alternatively, the display controller 2 can use an interpolation or approximation algorithm to calculate the values of the other display parameters for first display parameter values that are not included in the look-up table. Such an algorithm can use splines or any other known mathematical technique. It represents a savings in terms of the amount of memory needed in the display controller 2.

For every new combination of parameter values, the picture is displayed according to the current new display settings during a certain interval of time. The interval is chosen to be long enough that the user can evaluate the quality of the picture on the screen 6 and has time to react if the user decides to keep the current new display settings. On the other hand, it may not be so long that the entire method takes too long to execute.

An alert is provided when alterations to the new display settings are made, for example, by flashing the icon 10 on the screen 6. This feature is especially important when the parameter values are changed in very small increments.

If, during the interval in which the parameter values are kept at their new values, the user does not press the single button 7 or 8, the first parameter value is again decreased or increased. If the user presses the button 7 or 8, then the parameter values being used at that moment are stored as the new permanent display settings to be used for normal viewing. The adjustment feature is now no longer active.

It will be clear to those skilled in the art that the invention is not limited to the above-described embodiment, which can be varied in a number of ways within the scope of the attached claims. In particular, the invention is not limited to television sets. The method according to the invention can be used in a number of other display devices, including computer monitors, both those with CRT and with LCD displays. Other display devices include beamers or projectors, which project an image on a screen from which it is reflected. It will be apparent that screen and display controller need not be comprised in one device, but can be separate, the display controller being part of a video card, for example.

The invention claimed is:

1. A method of changing display settings of a device for displaying a video signal, said method comprising the steps:

varying, in response to user input, the value of a first display parameter defining the display settings between a first limit and a second limit;

displaying an image on a screen according to the new display settings; and replacing the display settings by the new display settings upon a given command, characterized in that said method further comprises the step:

automatically varying the value of at least one other display parameter defining the display settings simultaneously with the varying of the value of the first display parameter, wherein upon attainment of the second limit, the first parameter value is reset to the first limit.

2. A display device comprising a video signal receiver, a display controller for processing the video signal according to certain display settings, defined by a plurality of display parameters and changeable through user-given commands, and an image projection system for converting the processed video signal to an image on a screen, wherein the display controller generates new display settings by varying, in response to user input, the value of a first display parameter defining the display settings, between a first limit and a second limit, processes the video signal according to the new display settings, and replaces the display settings by the new display settings upon a user-given command, characterized in that the display controller is programmed to generate the new display settings by automatically varying the value of at least one other display parameter defining the display settings simultaneously with the varying of the value of the first display parameter, wherein said display device comprises a single button for providing the user-given commands, and wherein said display device further comprises a timer, the display controller being programmed to generate the new display settings after the single button has been depressed over a certain time interval as determined by said timer.

* * * * *